(12) United States Patent
Cuny et al.

(10) Patent No.: US 8,186,985 B2
(45) Date of Patent: May 29, 2012

(54) MOLD APPARATUS FOR FORMING GROOVES IN TIRE SHOULDER

(75) Inventors: André Cuny, Habay La Neuve (BE); Yacine Ouyahia, Bercklange (LU); Christophe Jean Alexis Pierre, Aubange (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 103 days.

(21) Appl. No.: 12/906,395

(22) Filed: Oct. 18, 2010

(65) Prior Publication Data
US 2011/0151040 A1    Jun. 23, 2011

Related U.S. Application Data

(60) Provisional application No. 61/287,443, filed on Dec. 17, 2009.

(51) Int. Cl.
*B29C 35/02* (2006.01)
(52) U.S. Cl. .......................................... 425/37
(58) Field of Classification Search ................. 425/28.1, 425/37
See application file for complete search history.

(56) References Cited

U.S. PATENT DOCUMENTS

| | | | |
|---|---|---|---|
| 1,666,883 A * | 4/1928 | Lambert | 425/43 |
| 3,096,541 A * | 7/1963 | Sindelar | 425/37 |
| 3,480,062 A | 11/1969 | Hillhouse | 152/210 |
| 3,665,992 A | 5/1972 | Rossel | 152/208 |
| 3,672,421 A | 6/1972 | Anderson | 152/208 |
| 3,693,688 A | 9/1972 | Schuman | 152/210 |
| 3,712,358 A | 1/1973 | Einarsson | 152/208 |
| 3,747,659 A | 7/1973 | Caniz | 152/210 |
| 3,766,956 A | 10/1973 | Ruane et al. | 152/208 |
| 3,872,908 A | 3/1975 | Einarsson | 152/208 |
| 3,926,239 A | 12/1975 | Petersons et al. | 152/210 |
| 3,942,572 A | 3/1976 | Crandall | 152/208 |
| 4,076,065 A | 2/1978 | Somers | 152/210 |
| 4,143,114 A * | 3/1979 | Smith et al. | 264/326 |
| 4,171,718 A | 10/1979 | Walrave et al. | 152/222 |
| 4,619,301 A | 10/1986 | Hiroki | 152/210 |
| 4,676,289 A | 6/1987 | Yi Su | 152/210 |
| 4,815,513 A | 3/1989 | Hirakawa | 152/210 |
| 4,844,137 A | 7/1989 | Einarsson | 152/210 |
| 4,883,104 A | 11/1989 | Minami | 152/210 |
| 5,088,534 A | 2/1992 | Engel | 152/208 |
| 5,198,048 A | 3/1993 | Hojo | 152/210 |

(Continued)

FOREIGN PATENT DOCUMENTS

DE    2645639    4/1977

(Continued)

*Primary Examiner* — James Mackey
(74) *Attorney, Agent, or Firm* — June E. Rickey

(57) ABSTRACT

A mold device is described for use in a mold having a plurality of tread molding segments. Each tread molding segment has an end face for mating with an adjoining segment. The mold device includes a piston located on the segment end face and is actuated by the opening and closing of the mold. Each of the mold segments further includes a retractable blade assembly having a first and second chamber; wherein the piston is positioned within the first chamber and having a plunger end in communication with a temperature sensitive block of material and a spring. The first chamber is in fluid communication with a second chamber, wherein said second chamber further comprises a retractable blade mounted within a blade collar wherein the blade collar is slidably received within said second chamber; said second chamber further comprises a temperature sensitive block of material and a spring.

3 Claims, 6 Drawing Sheets

U.S. PATENT DOCUMENTS

| | | | |
|---|---|---|---|
| 5,198,049 A | 3/1993 | Hojo | 152/210 |
| 5,221,379 A | 6/1993 | Nicholas | 152/212 |
| 5,411,070 A | 5/1995 | Yadegar | 152/210 |
| 5,609,700 A | 3/1997 | West | 152/210 |
| 5,707,463 A | 1/1998 | Hansen | 152/210 |
| 5,788,335 A | 8/1998 | O'Brien | 301/45 |
| 5,800,649 A | 9/1998 | Eromaki | 156/114 |
| 5,810,451 A | 9/1998 | O'Brien | 301/45 |
| 6,022,082 A | 2/2000 | O'Brien | 301/45 |
| 6,044,883 A | 4/2000 | Noyes | 152/210 |
| 6,199,610 B1 | 3/2001 | Yanagawa | 152/209.5 |
| 6,244,666 B1 | 6/2001 | O'Brien | 301/45 |
| 6,386,252 B1 | 5/2002 | O'Brien | 152/208 |
| 6,905,564 B1 | 6/2005 | O'Brien et al. | 156/114 |
| 6,978,669 B2 | 12/2005 | Lionetti et al. | 73/146.4 |
| 7,338,269 B2 * | 3/2008 | Delbet et al. | 425/37 |
| 2002/0142056 A1 * | 10/2002 | Aperce et al. | 425/37 |
| 2002/0144763 A1 | 10/2002 | Komatsu | 152/211 |
| 2005/0092411 A1 | 5/2005 | O'Brien | 152/209.18 |
| 2006/0096683 A1 | 5/2006 | Kahen | 152/216 |
| 2006/0191615 A1 | 8/2006 | O'Brien et al. | 152/209.1 |
| 2006/0213595 A1 | 9/2006 | Volt et al. | 152/210 |
| 2007/0077320 A1 * | 4/2007 | Delbet et al. | 425/28.1 |
| 2007/0079915 A1 | 4/2007 | Jones | 152/210 |
| 2007/0144646 A1 | 6/2007 | Mancia et al. | 152/210 |

FOREIGN PATENT DOCUMENTS

| | | |
|---|---|---|
| EP | 0709238 | 5/1996 |
| EP | 0844108 | 5/1998 |
| FR | 2196919 | 3/1974 |
| FR | 2198851 | 4/1974 |
| FR | 2216131 | 8/1974 |
| FR | 2278510 | 2/1976 |
| FR | 2577851 | 8/1986 |
| FR | 2580236 | 10/1986 |
| FR | 2581593 | 11/1986 |
| FR | 2613669 | 10/1988 |
| FR | 2805775 | 9/2001 |
| IT | 1187089 | 12/1987 |
| JP | 58112809 | 7/1983 |
| JP | 60219104 | 11/1985 |
| JP | 61094804 | 5/1986 |
| JP | 61295106 | 12/1986 |
| JP | 62059109 | 3/1987 |
| JP | 62227805 | 10/1987 |
| JP | 62231805 | 10/1987 |
| JP | 63170108 | 7/1988 |
| JP | 01229705 | 9/1989 |
| JP | 1254408 | 10/1989 |
| JP | 2279402 | 11/1990 |
| JP | 3114904 | 5/1991 |
| JP | 6166305 | 6/1994 |
| JP | 9058225 | 3/1997 |
| JP | 09240221 | 9/1997 |
| JP | 2001158210 | 6/2001 |
| JP | 2003039918 | 2/2003 |
| SE | 8901892 | 11/1990 |
| SU | 998141 | 2/1983 |
| WO | WO 87/00488 | 1/1987 |
| WO | WO 90/10549 | 9/1990 |
| WO | WO 91/12972 | 9/1991 |
| WO | WO 97/06021 | 2/1997 |
| WO | WO 01/08907 | 2/2001 |

* cited by examiner

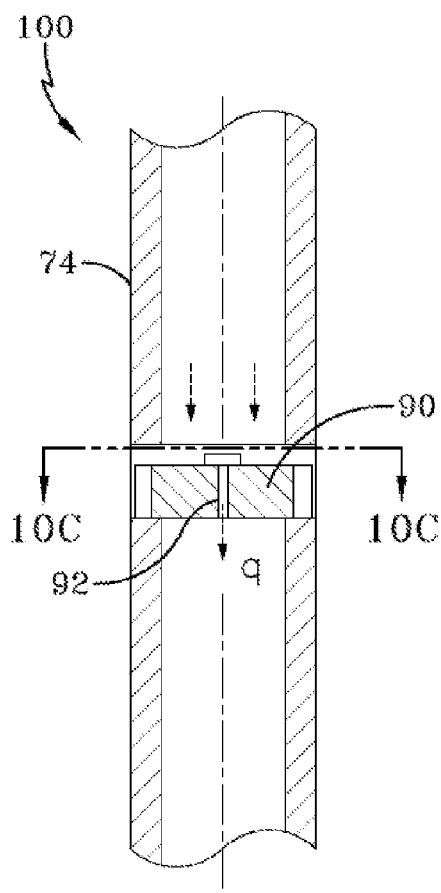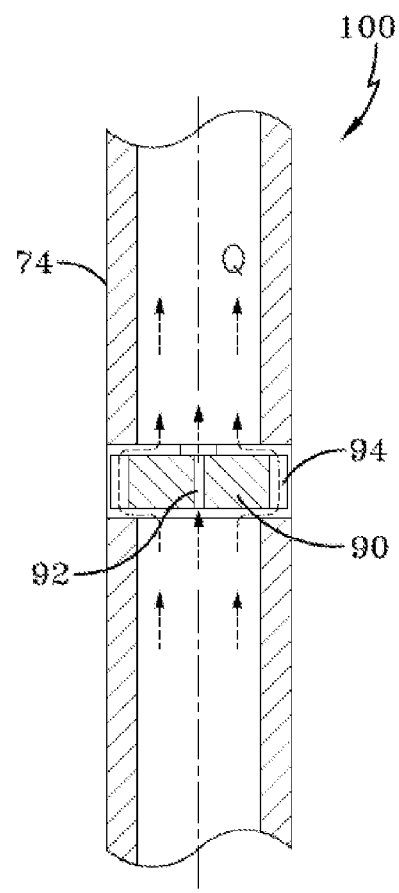
FIG-10A  FIG-10B
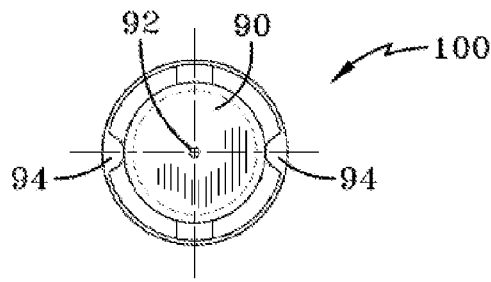
FIG-10C

MOLD APPARATUS FOR FORMING GROOVES IN TIRE SHOULDER

CROSS REFERENCE TO OTHER APPLICATIONS

This application claims the benefit of and incorporates by reference U.S. Provisional Application No. 61/287,443 filed Dec. 17, 2009.

FIELD OF THE INVENTION

The invention relates to a tire mold and a pneumatic tire having grooves in the shoulder area oriented in the axial direction.

BACKGROUND OF THE INVENTION

Creation of internal grooves in the shoulder area of a tire that are oriented axially may have several advantages. First, the axial grooves may decrease the heat generation in the tire that is built up when the tire is rolling. Second, the grooves may evacuate the water by the tire side during operation on a vehicle, which may improve the visibility of drivers behind the vehicle. The grooves also provide tire flexibility in the shoulder area which may improve tire performance. The grooves may also be used to mount temperature sensing devices to monitor the shoulder temperature. The grooves may be also used to install retractable stud pins for enhanced winter driving.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

BRIEF DESCRIPTION OF THE DRAWINGS

The invention will be described by way of example and with reference to the accompanying drawings in which:

FIG. 10 illustrates a flow restrictor of the present invention.

DETAILED DESCRIPTION OF THE INVENTION

Figure 1:
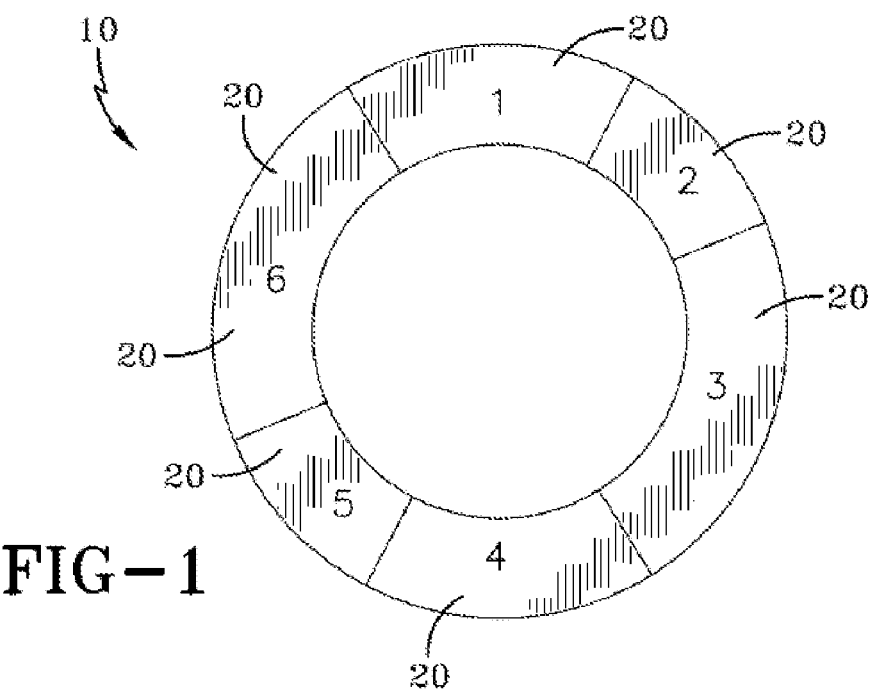
FIG. 1 is a simplified schematic of the segments of a tire mold apparatus shown in the closed position.

Referring to the drawings and particularly to FIGS. 1-8, a first embodiment of a tire mold apparatus 10 is shown. The tire mold apparatus is useful for molding lateral grooves in the side of a tire. The tire mold 10 comprises a plurality of tread molding segments 20 having an inner surface 25 for molding the tire tread. The tire mold further comprises other components which have been removed for clarity, and are otherwise known to those skilled in the art.

Figure 2:
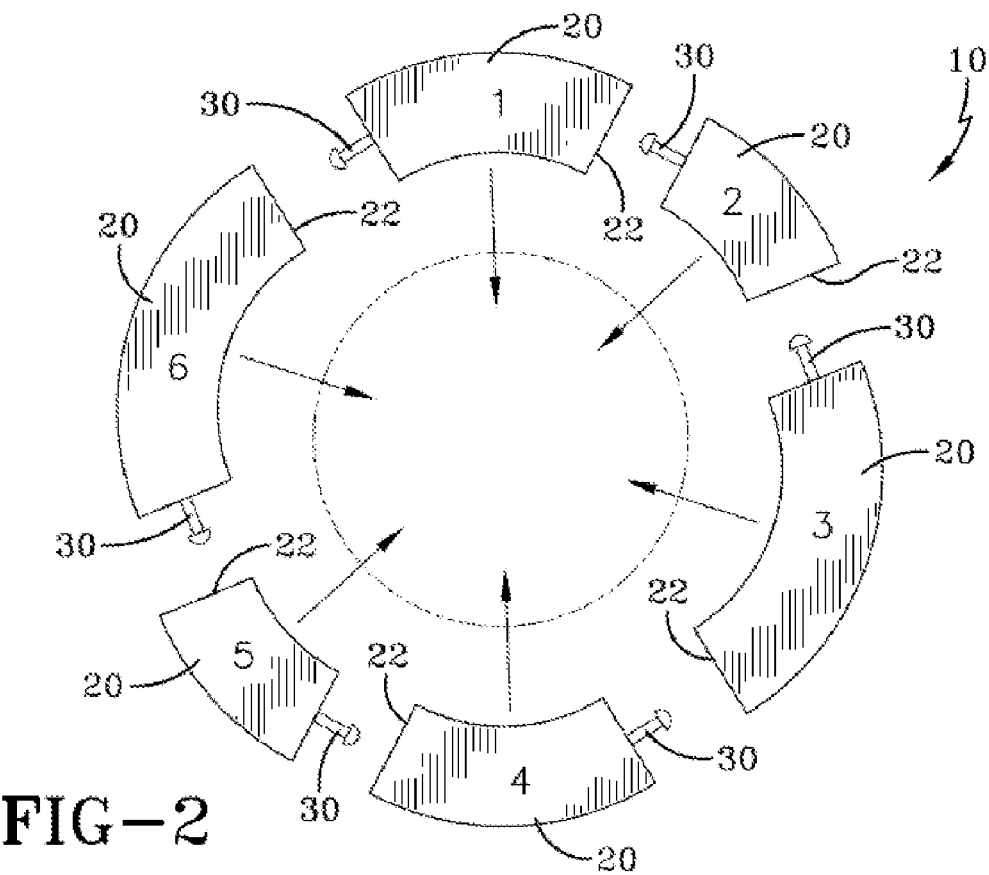
FIG. 2 is the schematic of FIG. 1 shown in the open position.

FIG. 1 illustrates the mold segments 20 in the closed position, and FIG. 2 illustrates the mold segments in the open position. Each mold segment has a piston 30 which is positioned for engagement with the mating end 22 of adjoining segment.

Figure 3:
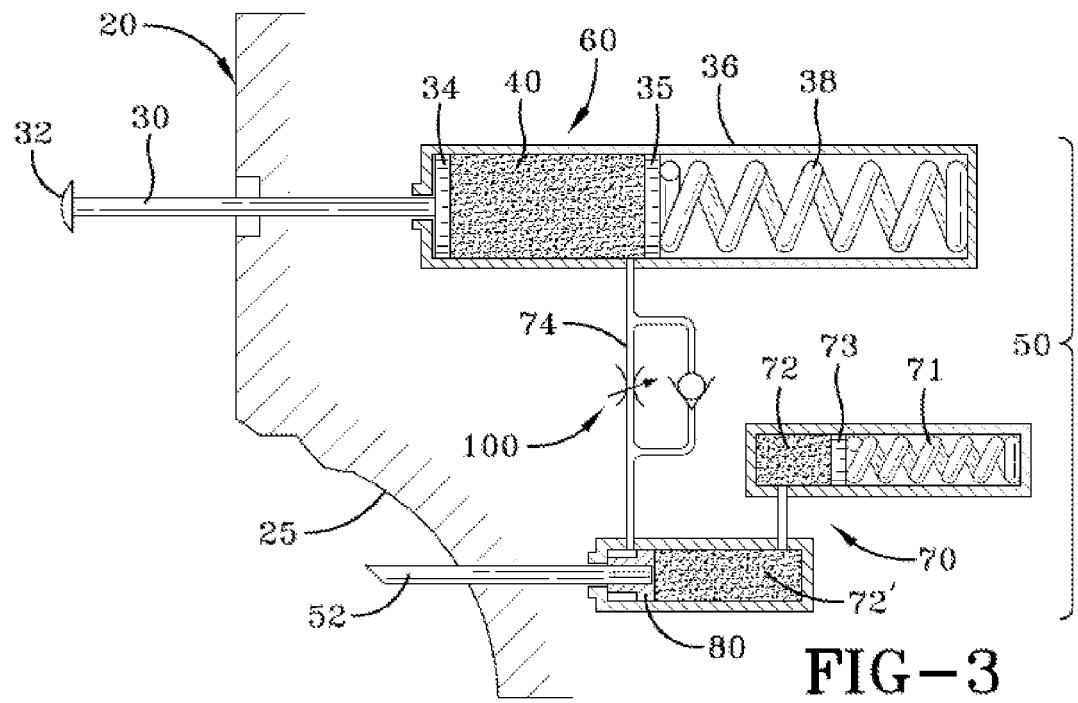
FIG. 3 is a close-up cross-sectional view of a portion of a tread segment showing a first embodiment of the shoulder blade apparatus in the open or starting position.

FIG. 3 illustrates a cross-sectional view of a portion of a tread segment and further illustrating a shoulder blade apparatus 50, shown in the open position. The shoulder blade apparatus comprises a piston 30 which is actuated when the mold segments are in the closed position as shown in FIG. 1. The shoulder blade apparatus has a retractable blade 52 for forming a hole in a green tire, and is shown in the shoulder area of the tire. The retractable blade is actuated by a main piston device 60. The piston 30 has a first end 32 for engagement with the end of an adjoining segment, and a second plunger end 34 which is received within a chamber 36 of the main piston device. The chamber 36 further includes a spring 38. Positioned between the spring 38 and the plunger ends 34, 35 is a plug 40 selected from a material that has a viscosity in the range of about 800 to about 1200 MPas. One example of a material suitable for use as a working material is an RTV type silicone, which is in the form of a jelly or paste at room temperature. An RTV type silicone suitable for use as a working fluid is sold under the trade name Silgel 612 by Wacker Chemie AG.

The shoulder blade apparatus further comprises a second piston device 70. The second piston device includes a spring 71 which cooperates with a piston 73. The piston travels in chamber 72. The chamber 72 also has a plug 40. The chamber 72 may be a single unit or split into two units 72, 72' due to space limitations, as shown in FIG. 3. The chamber 72 is in fluid communication with the chamber 36 of the main piston device via channel 74. The channel 74 has a restrictor device 100 which allows a small amount of fluid to pass from chamber 36 to chamber 72. The restrictor device is described in more detail, below. As the fluid flows from chamber 36 to chamber 72, eventually the collar 80 of the retractable blade 52 is slid in the chamber 72 retracting the blade 52 from the cured tire.

Figure 4:
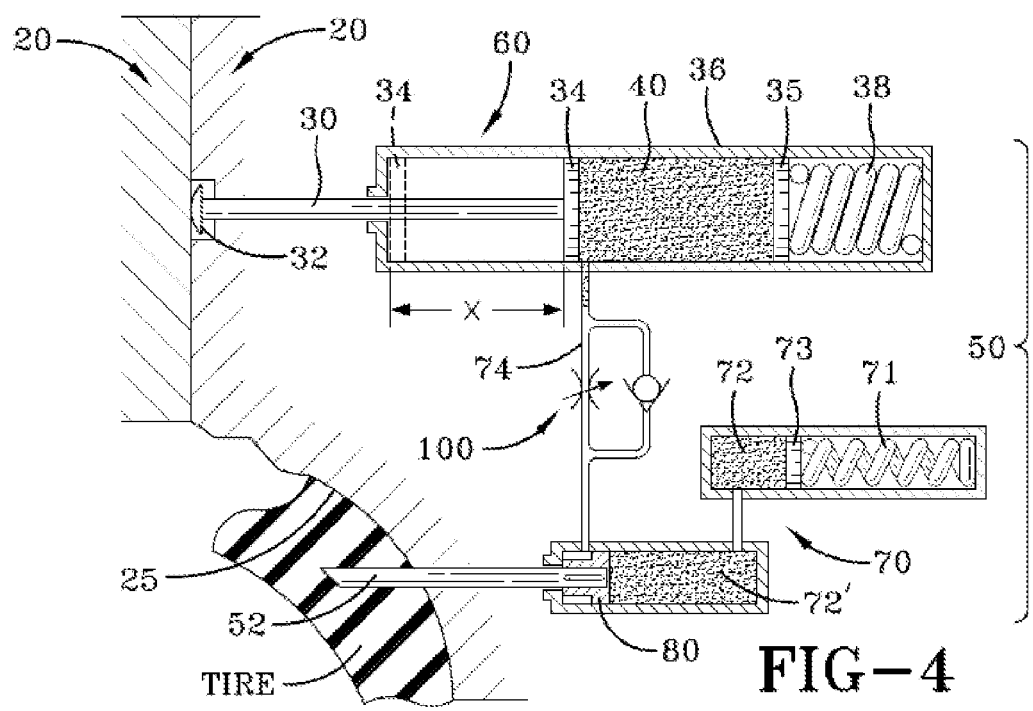
FIG. 4 illustrates the first embodiment of the shoulder blade apparatus shown after the mold has closed.

FIG. 4 illustrates the blade apparatus in the loaded condition after the mold has closed. Piston 30 is retracted into the chamber 36 so that plunger 34 pushes the silicone a distance X against the spring. The spring is compressed in the chamber. The blade 52 has been inserted into the green tire.

Figure 5:
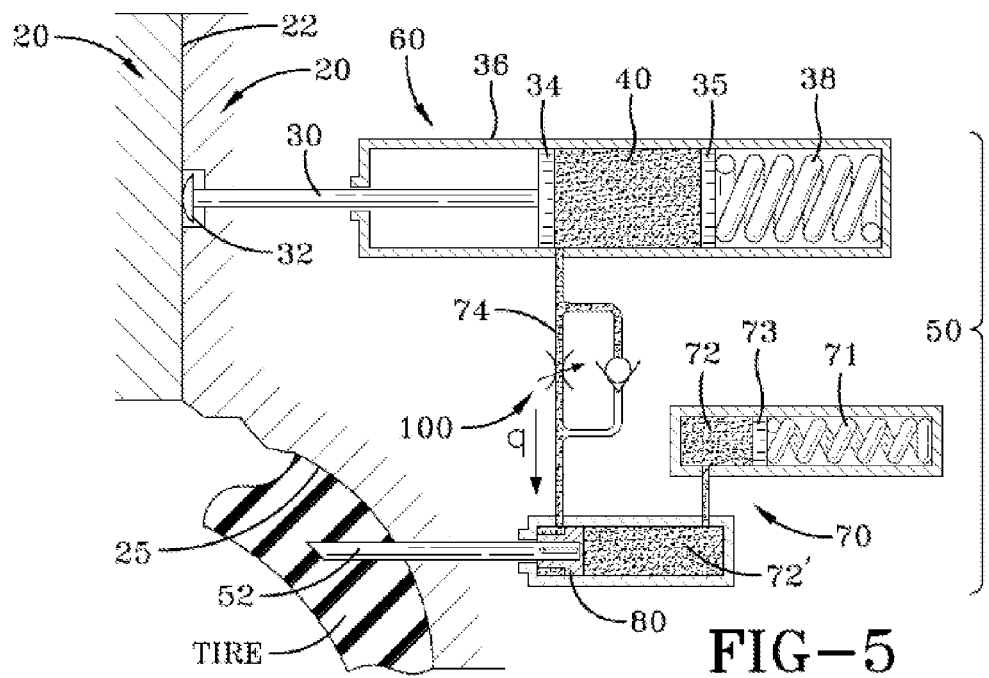
FIG. 5 illustrates the first embodiment of the shoulder blade apparatus after the mold has closed and the temperature is increased during the initiation of the mold curing process.
Figure 6:
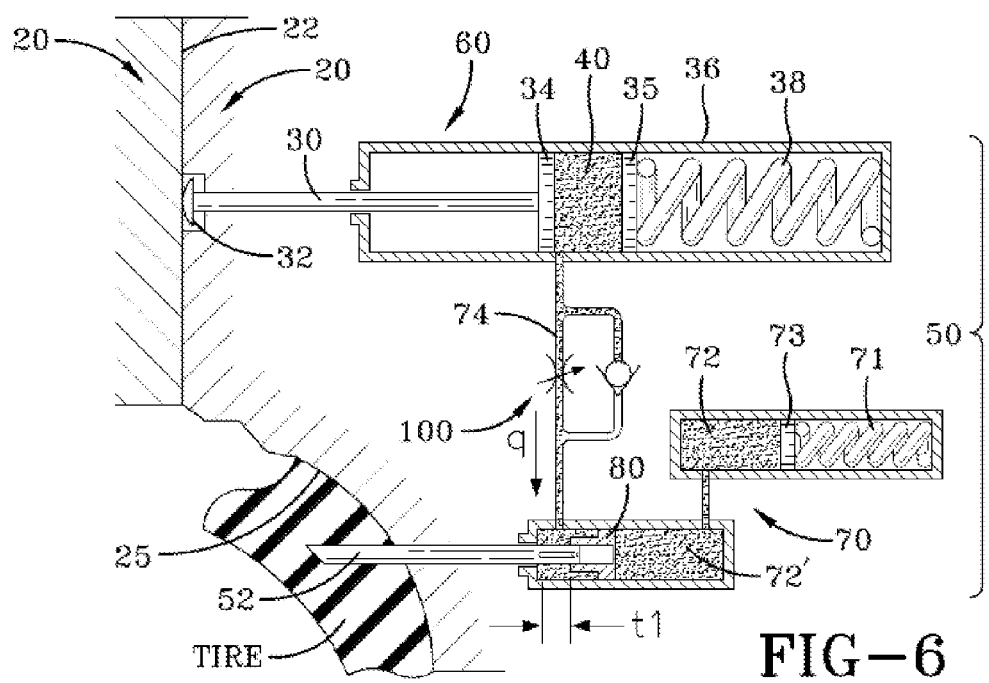
FIG. 6 illustrates the first embodiment of the shoulder blade apparatus after the mold has closed and the tire is undergoing the cure cycle.
Figure 7:
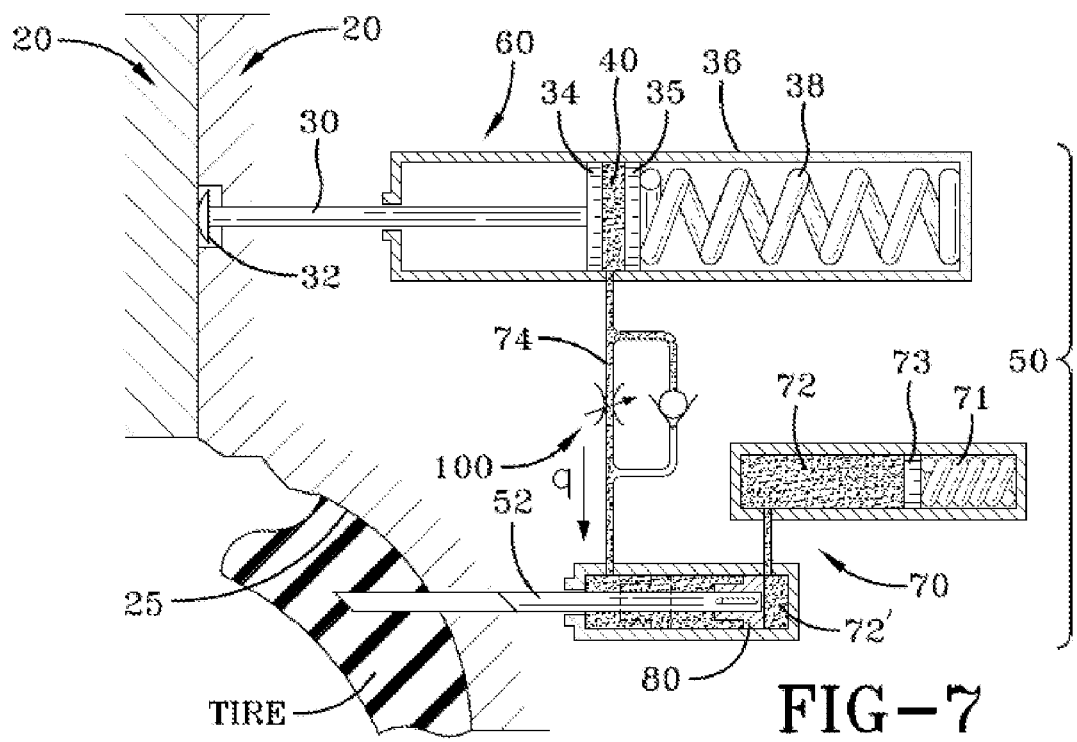
FIG. 7 illustrates the first embodiment of the shoulder blade apparatus showing the blade moving into the retracted position.

FIG. 5 illustrates the blade apparatus as the tire mold is heated. As the silicone is heated it expands. The silicone travels via channel 74 through the restrictor into the second chamber 72. At the time of cure, the fluid continues to flow into the second chamber 72, pushing the blade collar 80 away from the tire. As the collar is slid back, the blade is retracted. FIG. 7 illustrates the full retraction of the blade. The parameters of the system such as the channel flow rate are selected to time the retraction of the blade after the tire is cured.

Figure 8:
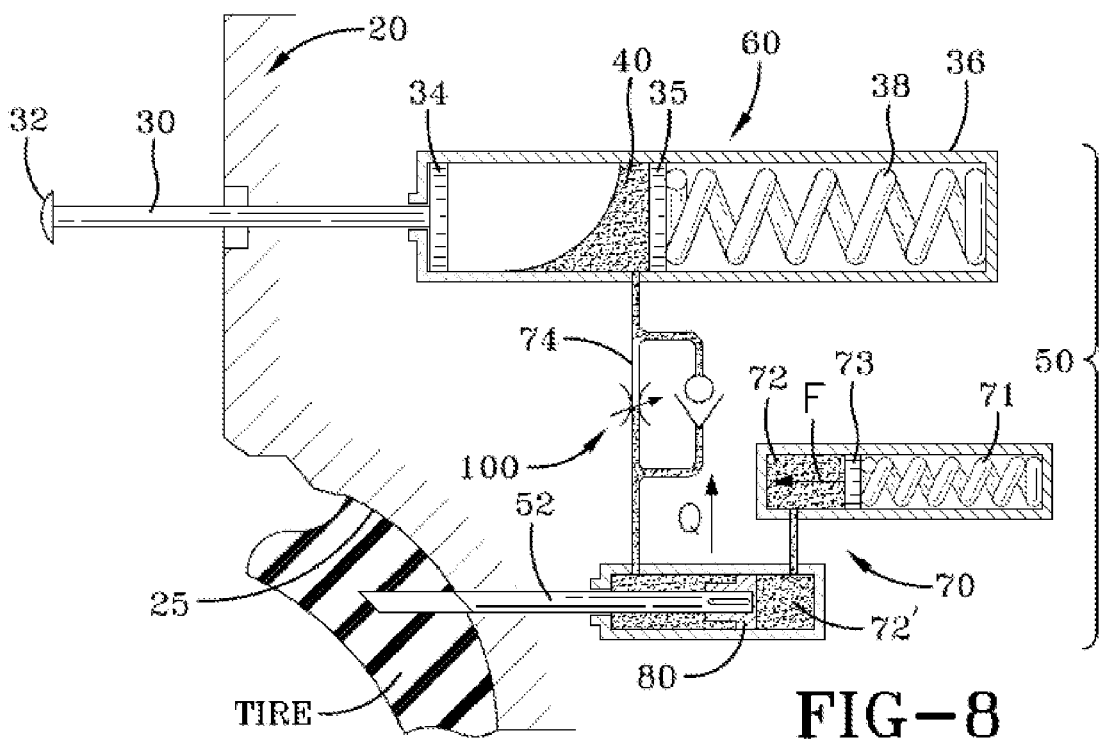
FIG. 8 illustrates the mold in the open position and the shoulder blade apparatus being returned to its initial position.

FIG. 8 illustrates the opening of the mold wherein the chamber 36 is opened to its fully open position as the piston moves out of the chamber. The liquid silicone moves from the second chamber to the first chamber through the check valve in a rapid fashion, resetting the apparatus into the mold ready position so that the cycle can be repeated.

Figure 9:
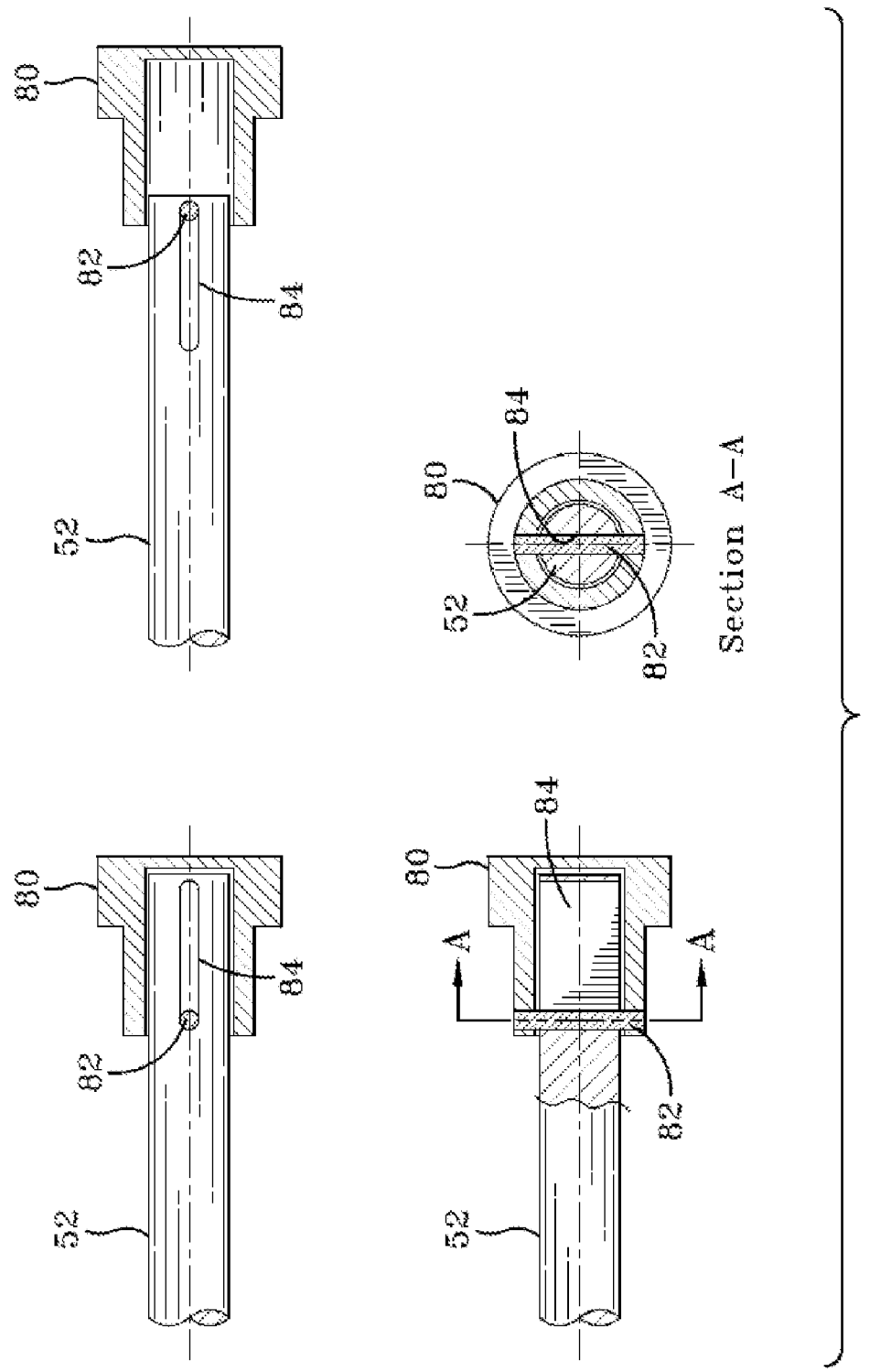
FIG. 9 illustrates a collar of the retractable blade.

FIG. 9 illustrates the retractable blade 52 which is slidably received within collar 80. The blade has a slot 84 located at one end. A pin 82 is received within the slot.

FIG. 10 illustrates one example of a flow restrictor 100 suitable for use with the invention. The flow restrictor is located within channel 74. The flow restrictor is designed to allow only a small amount of flow q when the fluid flows in a first direction. The flow restrictor is only allows flow through small hole 92, while other holes 94 are sealed off by the channel 74. When the flow reverses direction as shown in FIG. 10B, a much larger flow rate q may pass through the restrictor due to the restrictor being unseated from the channel edges that block off the outer flow paths 94. The larger flow rate allows rapid charging of the first chamber and a return to the initial position for restarting of the mold sequence.

The entire system is designed to time the retraction of the blade from the tire in accordance with the tire mold sequence. The flow rate q of the material from the first chamber to the second chamber is selected to ensure the retractable blade does not retract until the tire has been cured. Thus the chamber size and channel size are selected for the proper timing to occur.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire mold comprising: a plurality of tread molding segments, each tread molding segment having an end face for mating with an adjoining tread molding segment, each of said segments further comprising a piston located on said end face and actuated by the opening and closing of the mold; each of said mold segments further comprising a retractable blade assembly having a first and second chamber; wherein the piston is positioned within the first chamber and having a plunger end in communication with a temperature sensitive block of material and a spring; said first chamber being in fluid communication with said second chamber; wherein said second chamber further comprises a retractable blade mounted within a blade collar wherein the blade collar is slidably received within said second chamber; said second chamber further comprises a temperature sensitive block of material and a spring.

2. The mold of claim 1 wherein the temperature sensitive block of material is solid at room temperature and a liquid at a temperature greater than 200 deg F.

3. The mold of claim 1 wherein the temperature sensitive block of material is formed of silicone.

* * * * *